United States Patent
Pendakur et al.

(10) Patent No.: US 7,292,574 B2
(45) Date of Patent: Nov. 6, 2007

(54) AUTOMATED METHOD FOR MAPPING CONSTANT BIT-RATE NETWORK TRAFFIC ONTO A NON-CONSTANT BIT-RATE NETWORK

(75) Inventors: Ramesh Pendakur, Hillsboro, OR (US); Curtis E. Jutzi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1109 days.

(21) Appl. No.: 10/261,827

(22) Filed: Sep. 30, 2002

(65) Prior Publication Data

US 2004/0062268 A1  Apr. 1, 2004

(51) Int. Cl.
*H04L 12/54* (2006.01)
(52) U.S. Cl. ........................ 370/391; 370/428
(58) Field of Classification Search ............... None
See application file for complete search history.

(56) References Cited

U.S. PATENT DOCUMENTS

| | | | | |
|---|---|---|---|---|
| 5,365,524 A * | 11/1994 | Hiller et al. | ........... | 370/376 |
| 5,541,852 A * | 7/1996 | Eyuboglu et al. | ........... | 709/232 |
| 5,818,836 A * | 10/1998 | DuVal | ........... | 370/389 |
| 6,091,458 A * | 7/2000 | Jeon et al. | ........... | 348/554 |
| 6,167,030 A * | 12/2000 | Kilkki et al. | ........... | 370/236 |
| 6,477,706 B1 * | 11/2002 | Hua et al. | ........... | 725/96 |
| 6,574,279 B1 * | 6/2003 | Vetro et al. | ........... | 375/240.23 |
| 6,650,705 B1 * | 11/2003 | Vetro et al. | ........... | 375/240.08 |
| 6,657,954 B1 * | 12/2003 | Bird et al. | ........... | 370/229 |
| 6,879,634 B1 * | 4/2005 | Oz et al. | ........... | 375/240.26 |
| 6,885,637 B1 * | 4/2005 | Shvodian | ........... | 370/229 |
| 6,970,481 B2 * | 11/2005 | Gray et al. | ........... | 370/519 |
| 2002/0061181 A1 * | 5/2002 | Honjo | ........... | 386/52 |
| 2002/0159457 A1 * | 10/2002 | Zhang et al. | ........... | 370/391 |
| 2003/0039233 A1 * | 2/2003 | Satt et al. | ........... | 370/338 |
| 2003/0078001 A1 * | 4/2003 | Thompson et al. | ........... | 455/12.1 |

FOREIGN PATENT DOCUMENTS

WO  WO0072601  * 11/2000

OTHER PUBLICATIONS

Wright, D.J. (Assessment of alternative transport options for video distribution and retrieval over ATM in residential broadband) Communications Magazine, IEEE vol. 35, Issue 12, Dec. 1997 pp. 78-82, 87.*

Daniel Gasparro (Inside the Carrier Cloud: Carriers are building next-generation IP-based networks that will provide expanded content-aware services. Network World, Oct. 30, 2000).*

Ohio telco offers quality video services over IP and ADSL using VideoTele.com's DHE solution. (Network Developments).(CT Communications )(Brief Article) XDSL News , 6, 3, 4(1) Mar. 2002.*

* cited by examiner

*Primary Examiner*—Hassan Kizou
*Assistant Examiner*—Salman Ahmed
(74) *Attorney, Agent, or Firm*—Marger, Johnson & McCollom, P.C.

(57) ABSTRACT

A constant-to-variable cache router is situated between a constant bit-rate network and a variable bit-rate network. A monitor within the variable bit-rate network measures the available bit-rate within the variable bit-rate network and communicates the available bit-rate to the constant-to-variable cache router. When data is received from the constant bit-rate network at the constant-to-variable cache router, the constant-to-variable cache router determines if the available bit-rate is large enough to support the delivery of the data from the constant bit-rate network at the constant bit-rate. If not, then the constant-to-variable cache router caches the data and delivers it at a rate dependent on the available bit-rate of the variable bit-rate network.

35 Claims, 9 Drawing Sheets

AUTOMATED METHOD FOR MAPPING CONSTANT BIT-RATE NETWORK TRAFFIC ONTO A NON-CONSTANT BIT-RATE NETWORK

FIELD

This invention pertains to networks, and more particularly to delivering data from a constant bit-rate network to a variable bit-rate network.

BACKGROUND

The connections between computers are not all the same. Whereas within a particular network the capacity may be a known constant, connections between computers on different networks may result in one computer delivering data to the other computer faster or slower than the other computer may process. A well-known example of this is the Internet. Although individual computers typically connect to Internet Service Providers (ISPs) using connections that run at roughly 1-2 megabits per second (Mbps), the backbone of the Internet, which connects the core computers of the Internet, allows for data to flow at rates hundreds and thousands times faster.

In addition, as an individual computer on a variable bit-rate network sends or receives data, the traffic consumes some of the network capacity. This traffic limits that amount of "other data" that may be sent over the network. Thus, the available bit-rate (also called the available bandwidth) of the connection varies from the maximum capacity of the connection. This situation is further compounded where the individual computer shares a connection to the Internet (for example, a computer connected via a cable-modem or within a Local Area Network (LAN)): the available bit-rate may vary without the individual computer sending or receiving data.

Where data is coming out of a constant bit-rate network, the data is being delivered at a known rate (hence the "constant bit-rate" in the description of the network). But where the data enters a variable bit-rate network, a problem may arise. The data coming from the constant bit-rate network may exceed the available bit-rate of the variable bit-rate network. Unless there is guarantee regarding the quality of service (something most variable bit-rate networks do not provide), data coming from the constant bit-rate network may be lost.

A need remains for a way deliver data from a constant bit-rate network to a variable bit-rate network without loss of data, that addresses these and other problems associated with the prior art.

DETAILED DESCRIPTION

Figure 1:
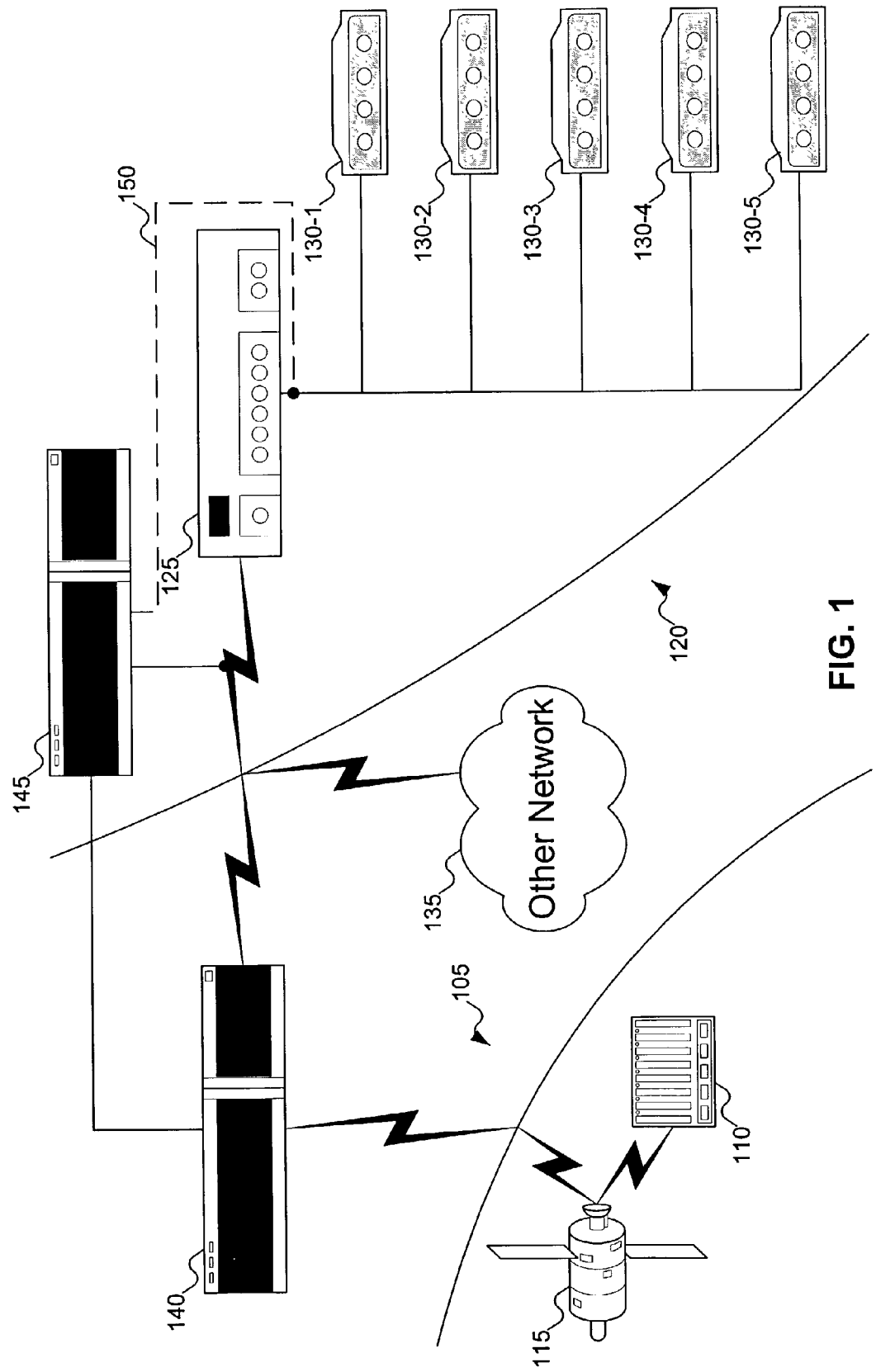
FIG. 1 shows a constant-to-variable cache router delivering data from a constant bit-rate network to a variable bit-rate network, according to an embodiment of the invention.

FIG. 1 shows a constant-to-variable cache router delivering data from a constant bit-rate network to a variable bit-rate network, according to an embodiment of the invention. In FIG. 1, constant bit-rate network 105 is shown as including content source 110 and satellite 115. Content source 110 stores the data desired by a computer on the variable bit-rate network, which is transmitted to satellite 115 for retransmission to the variable bit-rate network.

In FIG. 1, variable bit-rate network 120 is shown as including cable modem termination system (CMTS) 125. CMTS 125 is a device used by cable head end facility (essentially, an Internet Service Providers (ISPs) that offer cable-modem service to their customers (shown as modems 130-1 through 130-5)). CMTS 125 is a device that communicates with an individual user's cable-modem by assigning the (digital) data to a channel (similar to the channels used by television providers) on the coaxial cable. The data is then modulated and transmitted on the cable. (In some cable systems, fiber-optic cable is used to connect the ISP with the user's neighborhood. In such systems, known as Hybrid Fiber Coax system, converters are used to convert the data between formats used on the coaxial cable and fiber-optic cable.) At the user's end, the cable-modem reads the appropriate channel and demodulates the data back into a form recognizable by the computer.

Between the cable head end facility and the individual user's cable-modem, the data is transmitted using the Data Over Cable Service interface Specification (DOCSIS). DOCSIS is a protocol describing how cable companies may achieve cross-platform functionality in delivering digital data from the Internet. The current version of DOCSIS is version 2.0 and is available from CableLabs. See, e.g., the DOCSIS 2.0 Interface Specifications Summary, which at the time of filing this document, was available at Uniform Resource Locator (URL) http:##www.cablemodem.com#specifications20.html. (Please note that to prevent inadvertent hyperlinks, the slashes ("/") in the preceding URL were replaced with pound signs ("#").)

Variable bit-rate network 120 is capable of receiving data from sources other than constant bit-rate network 105. For example, network 135 may be a connection to the Internet, or a connection to another network (perhaps accessible only locally within variable bit-rate network 120).

A person skilled in the art will recognize that constant bit-rate network 105 may take forms other than a transmission from a satellite, provided that data leaving the constant bit-rate network leaves at a constant bit-rate. A person skilled in the art will also recognize that other systems may be used than cable-modem connections. For example, connections may be made using T1/T3 lines, Digital Subscriber Line (DSL) connections, dial-up modem connections, and even dedicated connections for individual computers. In the remainder of this document, constant bit-rate network 105 will be considered to be a satellite retransmission network, and variable bit-rate network 120 will be considered to be cable-modems serving a number of users.

Between constant bit-rate network 105 and variable bit-rate network 120 sits constant-to-variable cache router 140. Constant-to-variable cache router 140 is responsible for managing the transmission of data from constant bit-rate network 105 to variable bit-rate network 120. Constant-to-variable cache router 140 accomplishes this task by comparing the available bit-rate of variable bit-rate network 120 with the constant bit-rate of constant bit-rate network 105. If the available bit-rate of variable bit-rate network 120 exceeds the constant bit-rate of constant bit-rate network 105, then constant-to-variable cache router 140 may deliver the data at full speed without any concerns for lost data. But if the available bit-rate of variable bit-rate network 120 is less than the constant bit-rate of constant bit-rate network 105, then constant-to-variable cache router 140 delivers the data as fast as possible (that is, using as much of the available bit-rate as possible), while buffering the excess for later delivery (either when the data stream from constant bit-rate network 105 is complete or when the available bit-rate of variable bit-rate network 120 goes up).

Although constant-to-variable cache router 140 may know the constant bit-rate of constant bit-rate network 105 without any outside assistance (the bit-rate is, after all, constant), it needs to know the available bit-rate, a variable quantity, from variable bit-rate network 120. Monitor 145 is responsible for monitoring the traffic on variable bit-rate network 120, determining the available bit-rate of variable bit-rate network 120, and communicating this information to constant-to-variable cache router 140. This enables constant-to-variable cache router 140 to determine how much data it may push onto variable bit-rate network 120.

In FIG. 1, monitor 145 is shown on the network side of CMTS 125. A person skilled in the art will recognize that monitor 145 may be positioned on either side of CMTS 125, as long as monitor 145 may determine the total traffic across the variable bit-rate network. For example, monitor 145 may be positioned on the user side of CMTS 125, as shown by dashed line 150. In addition, although FIG. 1 shows monitor 145 as tapping into the network connection, monitor 145 may be positioned in-line with the network connection (that is, all data flows through monitor 145 on the way to or from CMTS 125).

Figure 2:
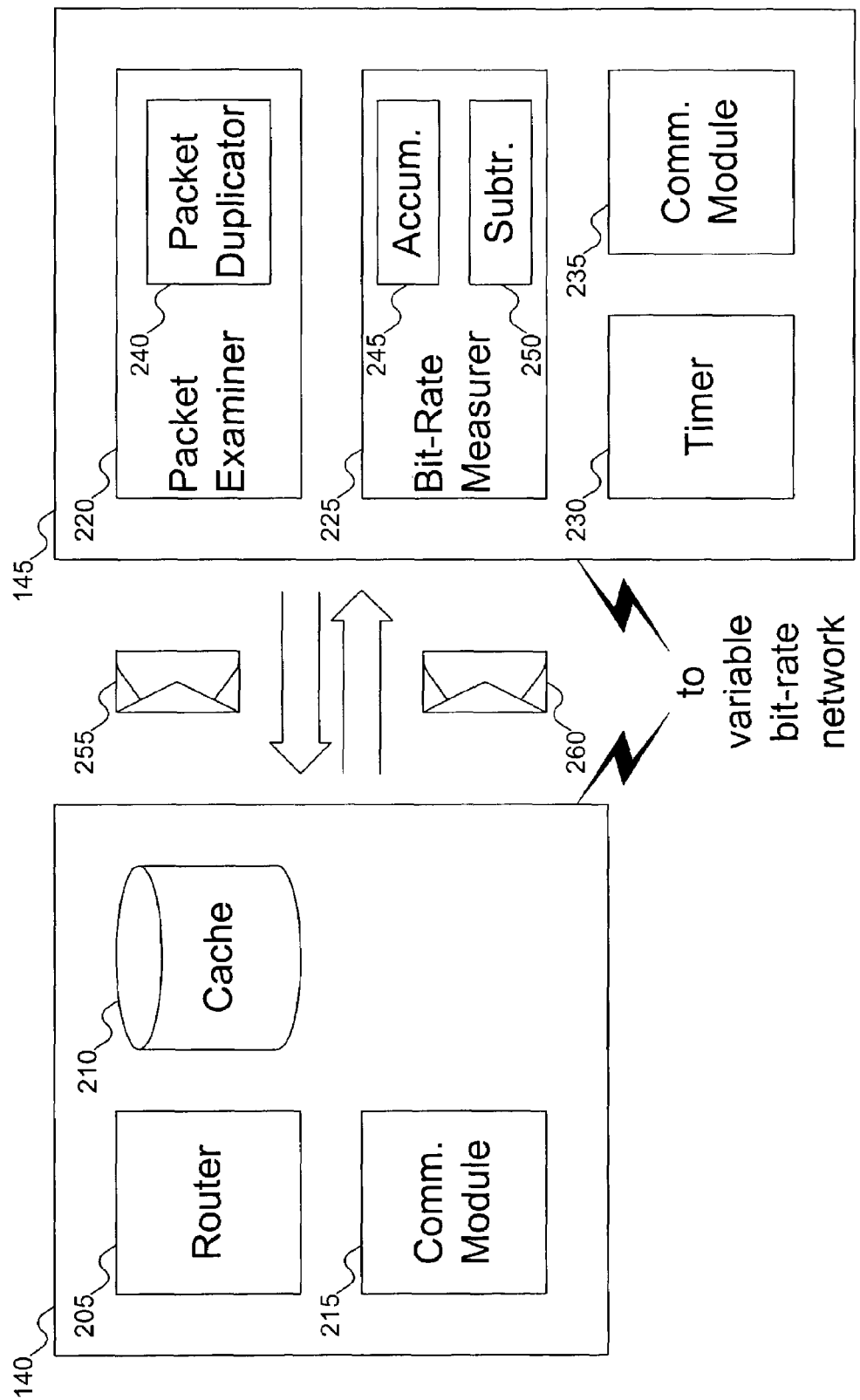
FIG. 2 shows components of the constant-to-variable cache router and monitor of FIG. 1, according to an embodiment of the invention.

FIG. 2 shows components of the constant-to-variable cache router and monitor of FIG. 1, according to an embodiment of the invention. In FIG. 1, constant-to-variable cache router 140 is shown as including router 205, cache 210, and communications module 215. Router 205 operates to route data from the constant bit-rate network to the variable bit-rate network. Cache 210 is used to buffer data that may not be immediately delivered to variable bit-rate network because the available bit-rate is less than the constant bit-rate of constant bit-rate network. The size of cache 210 is configurable, and may be changed as needed to suit a particular implementation. Communications module 215 communicates with monitor 145, and is used both to receive estimates of the available bit-rate of variable bit-rate network and to send feedback protocols to monitor 145, requesting a change in the calculation or timing of available bit-rate messages.

Constant-to-variable cache router 140 may take on different embodiments. In one embodiment, router 205 routes data directly to the variable bit-rate network whenever the available bit-rate of the variable bit-rate network exceeds the constant bit-rate, and only uses cache 210 when the available bit-rate of the variable bit-rate network is less than the constant bit-rate. In another embodiment, data from the constant bit-rate network are always routed through cache 210, even if the available bit-rate of the variable bit-rate network 120 exceeds the constant bit-rate. This second embodiment has the advantage of simplicity, in that constant-to-variable cache router 140 does not need to start using cache 210 when the available bit-rate is less than the constant bit-rate, at the cost of slowing down data delivery (since the data from the constant bit-rate network always has to travel through cache 210). The first embodiment involves faster data delivery when the available bit-rate exceeds the constant bit-rate, but is a more complicated model.

A person skilled in the art will recognize that constant-to-variable cache router 140 does not know the exact available bit-rate at every moment in time, but rather only knows an approximation of the available bit rate. Consequences of this fact are discussed further below with reference to FIG. 6.

Monitor 145 includes packet examiner 220, bit-rate measurer 225, timer 230, and communications module 235. Packet examiner 225 is responsible for examining packets of data, to determine which ones are crossing the variable bit-rate network and need to be included in determining the available bit-rate. In one embodiment of the invention, packet examiner 225 opens up every packet, considers whether to include the packets in calculating the available bit-rate, and then delivers the packets on toward their destinations. But since this may slow down the delivery of the packets, this approach may slow down the traffic on the variable bit-rate network, resulting in a lower available bit-rate calculation. To avoid this problem, in a second embodiment, packet examiner 225 includes packet duplicator 240. Packet duplicator 240 is responsible for duplicating every packet arriving at monitor 145. Then, the original packets may be permitted to continue to their destinations without delay, while the duplicate packets are examined to calculate the available bit-rate.

Bit-rate measurer 225 is responsible for calculating the available bit-rate of the variable bit-rate network. As described above with reference to FIG. 1, the available bit-rate is the difference between the maximum capacity of the variable bit-rate network and the traffic on the variable bit-rate network. To perform this calculation, bit-rate measurer includes accumulator 245 and subtractor 250. Accumulator 245 determines the amount of traffic crossing the variable bit-rate network by accumulating every packet determined by packet examiner 220 to be crossing the variable bit-rate network. Subtractor then subtracts the amount of traffic determined by accumulator 245 from the maximum capacity of the variable bit-rate network, thereby calculating the available bit-rate of the variable bit-rate network.

Timer 230 is responsible for timing the determination of the available bit-rate of the variable bit-rate network. In one embodiment, there may be two timers in monitor 145: one for timing an interval of traffic on the variable bit-rate network, and one for determining how frequently to communicate the newly-calculated available bit-rate to constant-to-variable cache router 140.

Communications module 235 is the counterpart in monitor 145 to communications module 215 of constant-tovariable cache router 140. Communications module 235 sends messages to constant-to-variable cache router 140, informing constant-to-variable cache router 140 of the available bit-rate on the variable bit-rate network. Communications module 235 also receives feedback protocols from constant-to-variable cache router 140, which indicate changes to be made in how and/or when monitor 145 calculates the available bit-rate.

Communications modules 215 and 235 are shown communicating with each other in FIG. 2 using messages 255 and 260. Message 255, originating in monitor 145, is an estimate of the available bit-rate. Clearly, this is not a one-time thing: monitor 145 sends messages to constant-to-variable cache router 140 regularly, alerting constant-to-variable cache router 140 of changes in the available bit-rate. There are several ways monitor 145 may implement this. Monitor 145 may determine the available bit-rate over a time interval, report the result to constant-to-variable cache router 140, and then repeat the process. Or monitor 145 may determine the available bit-rate over a time interval, and report the result out only if it differs significantly (for example, a 1% or greater variation) from the previously reported available bit-rate. Or monitor 145 may determine the available bit-rate over a time interval, report the result, and wait until constant-to-variable cache router 140 requests a new determination of the available bit-rate. A person skilled in the art will recognize other ways in which monitor 145 may iterate its process.

Message 260 represents a feedback protocol from constant-to-variable cache router 140 to monitor 145. The feedback protocol is a message letting monitor 145 know to change how it calculates and/or reports the available bit-rate to constant-to-variable cache router 140. For example, constant-to-variable cache router 140 may request that monitor 145 report the available bit-rate twice as frequently, or half as frequently, as it had been doing in the past. Or constant-to-variable cache router 140 may request that monitor 145 only report out the available bit-rate when the available bit-rate changes significantly (say, by 5% or more). A person skilled in the art will recognize other feedback protocols that constant-to-variable cache router 140 may use.

Figure 3:
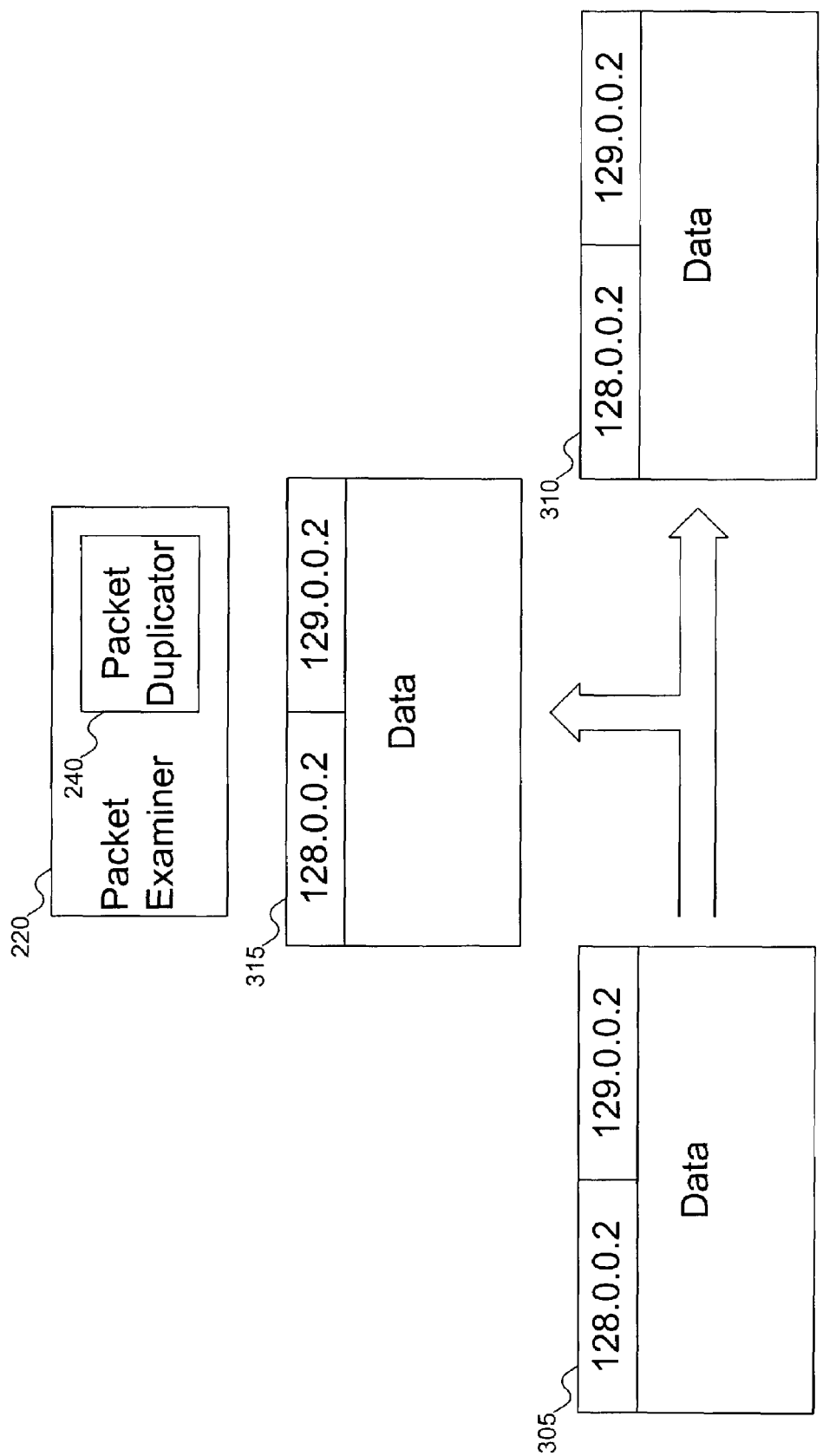
FIG. 3 shows the operation of the monitor of FIG. 1, according to an embodiment of the invention.

FIG. 3 shows the operation of the monitor of FIG. 1, according to an embodiment of the invention. As mentioned above with reference to FIG. 2, packet examiner 220 may include packet duplicator 240. FIG. 3 shows this embodiment in action) (A person skilled in the art will recognize that packet examiner 220 may determine which packets constitute traffic across the variable bit-rate network by examining the original packet.)

Packet examiner 220 begins by having packet duplicator 240 duplicate the present packet. For example, packet 305 is shown being duplicated. The original packet continues as packet 310, which may be delivered to the appropriate place within the network (for example, CMTS 125 in FIG. 1). Duplicate packet 315 may then be examined to determine if the packet is traffic across the network that needs to con-sidered in determining the available bit-rate for the variable bit-rate network. The explanation of this process is continued with reference to FIG. 4.

Figure 4:
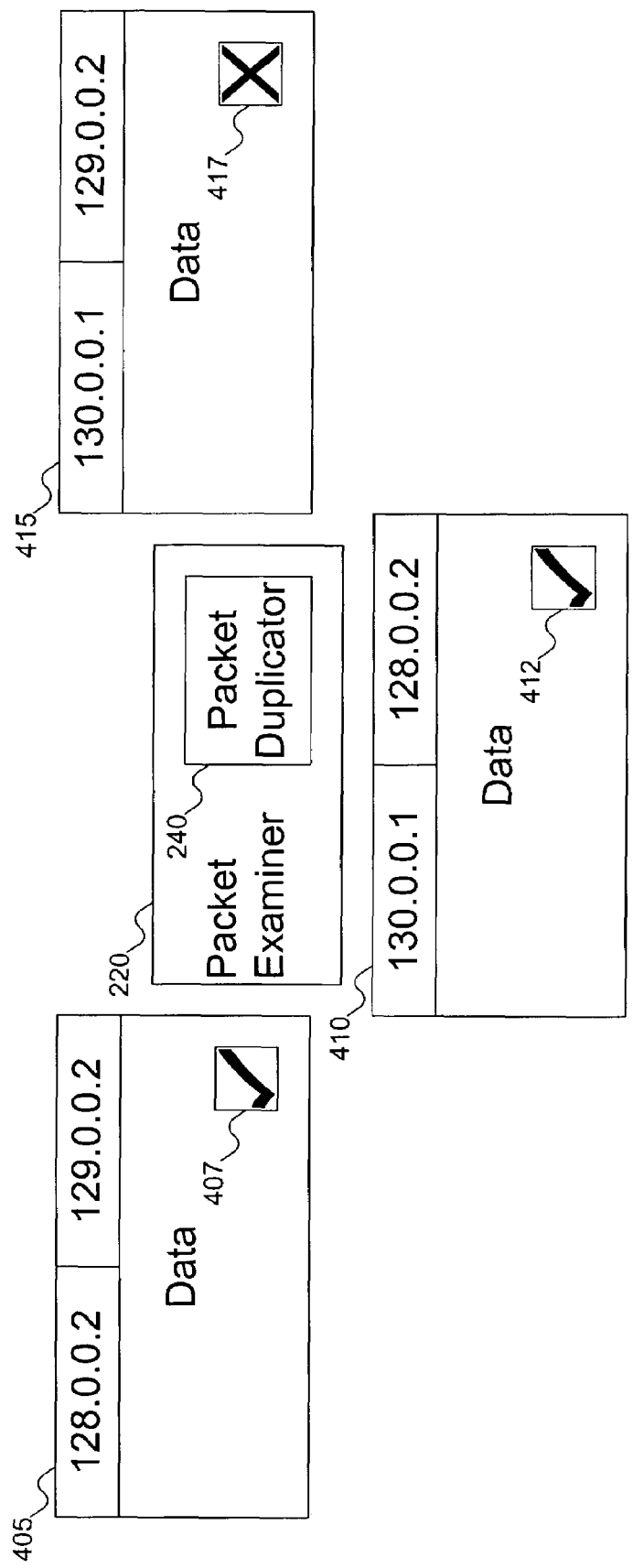
FIG. 4 shows the monitor of FIG. 1 determining which packets contribute to the traffic on the variable bit-rate network, according to an embodiment of the invention.

FIG. 4 shows the monitor of FIG. 1 determining which packets contribute to the traffic on the variable bit-rate network, according to an embodiment of the invention. In FIG. 4, packet examiner 220 is considering three different packets 405, 410, and 415. Packet examiner 220 looks at the source and destination Internet Protocol (IP) addresses in the packets. If the packets have source or destination addresses that are within the variable bit-rate network, then the packet is considered to be traffic on the variable bit-rate network. For example, if IP address 128.0.0.2 is an IP address on the variable bit-rate network, then packets 405 and 410 are considered to be crossing the variable bit-rate network (indicated by checkmarks 407 and 412, respectively). In contrast, packet 415 has neither a source nor a destination IP address within the variable bit-rate network. This may arise when a packet is transmitted to the variable bit-rate network in the expectation that the variable bit-rate network is the shortest/quickest way between two computers, and is a consequence of normal IP routing. Such packets are transitory and occasional, and are not considered traffic on the variable bit-rate network. Thus, packet 415 is not considered traffic on the variable bit-rate network, as indicated by X 417.

Figure 5:
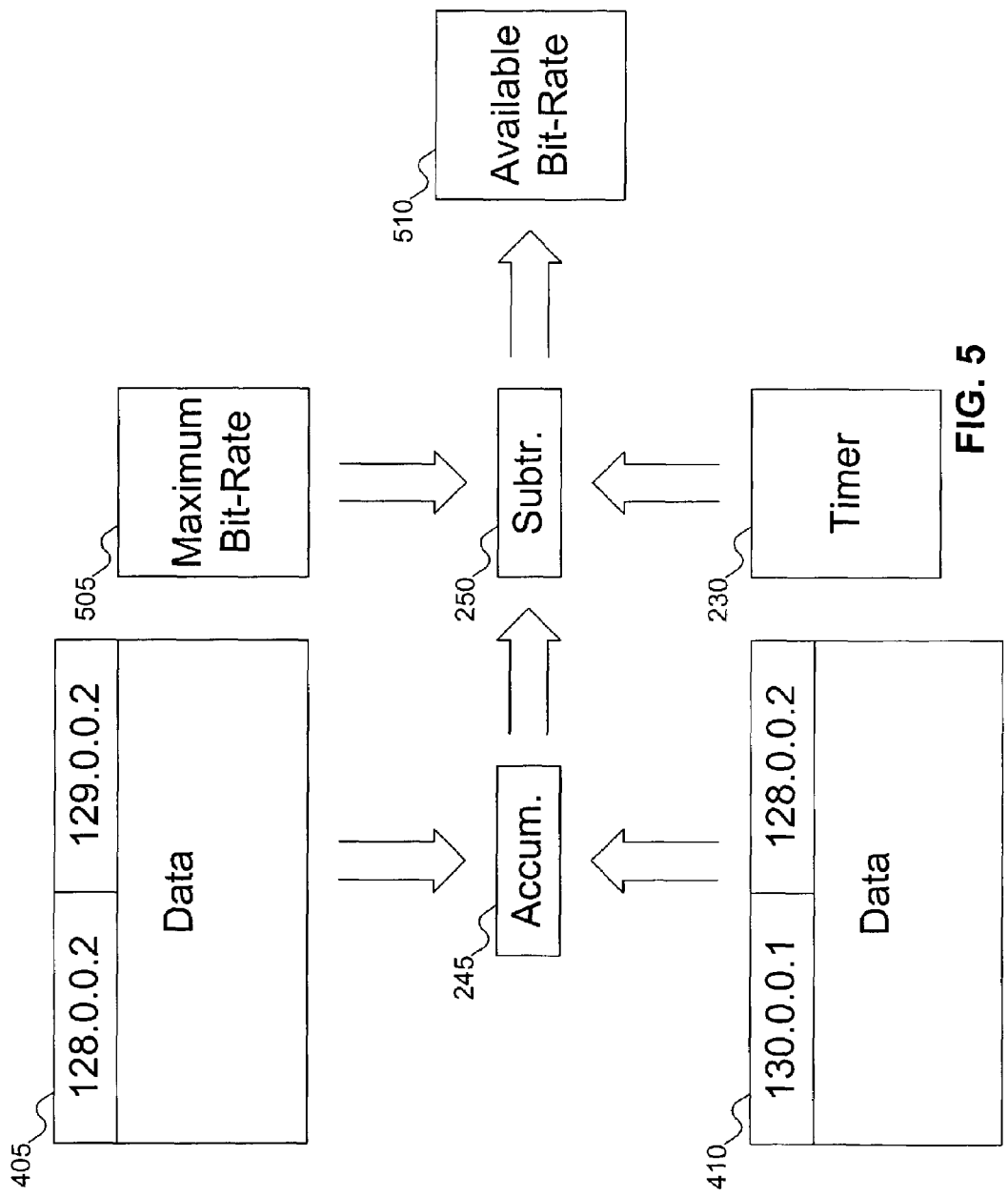
FIG. 5 shows the monitor of FIG. 1 determining the available bit-rate on the variable bit-rate network, according to an embodiment of the invention.

FIG. 5 shows the monitor of FIG. 1 determining the available bit-rate on the variable bit-rate network, according to an embodiment of the invention. Once a packet has been determined to be traffic on the variable bit-rate network, total traffic on the variable bit-rate network is determined. This is calculated by summing the sizes of all the data packets that are considered traffic on the variable bit-rate network. For example, in FIG. 4, packets 405 and 410 were determined to be traffic on the variable bit-rate network. Thus, accumulator 245 sums the sizes of packets 405 and 410 (along with any other packets considered to be traffic on the variable bit-rate network).

Once the sizes of all the packets that are considered traffic on the network have been summed, accumulator 245 delivers this result to subtractor 250. Subtractor takes maximum bit-rate 505 of the variable bit-rate network, a known quantity, and subtracts the bandwidth consumed by the traffic on the variable bit-rate network. The result is the available bit-rate of the variable bit-rate network.

Note that accumulator 245 and subtractor 250 nominally operate on quantities using different terms. Accumulator 245 determines the number of bits of traffic on the variable bit-rate network, whereas subtractor 250 takes as operands bit-rates. To convert the number of bits returned by accumulator 245 into a bit-rate, subtractor 250 uses the values from timer 230 to determine the time interval over which accumulator 245 operated. Then, by dividing the number of bits in the traffic on variable bit-rate network by the interval of measurement, subtractor 250 may calculate the bit-rate consumed by traffic on the variable bit-rate network. For example, if the traffic on the variable bit-rate network was 1 megabit (Mb) during an interval of one second, subtractor 250 may calculate the traffic bit-rate as one Megabit per second (Mbps).

Figure 6:
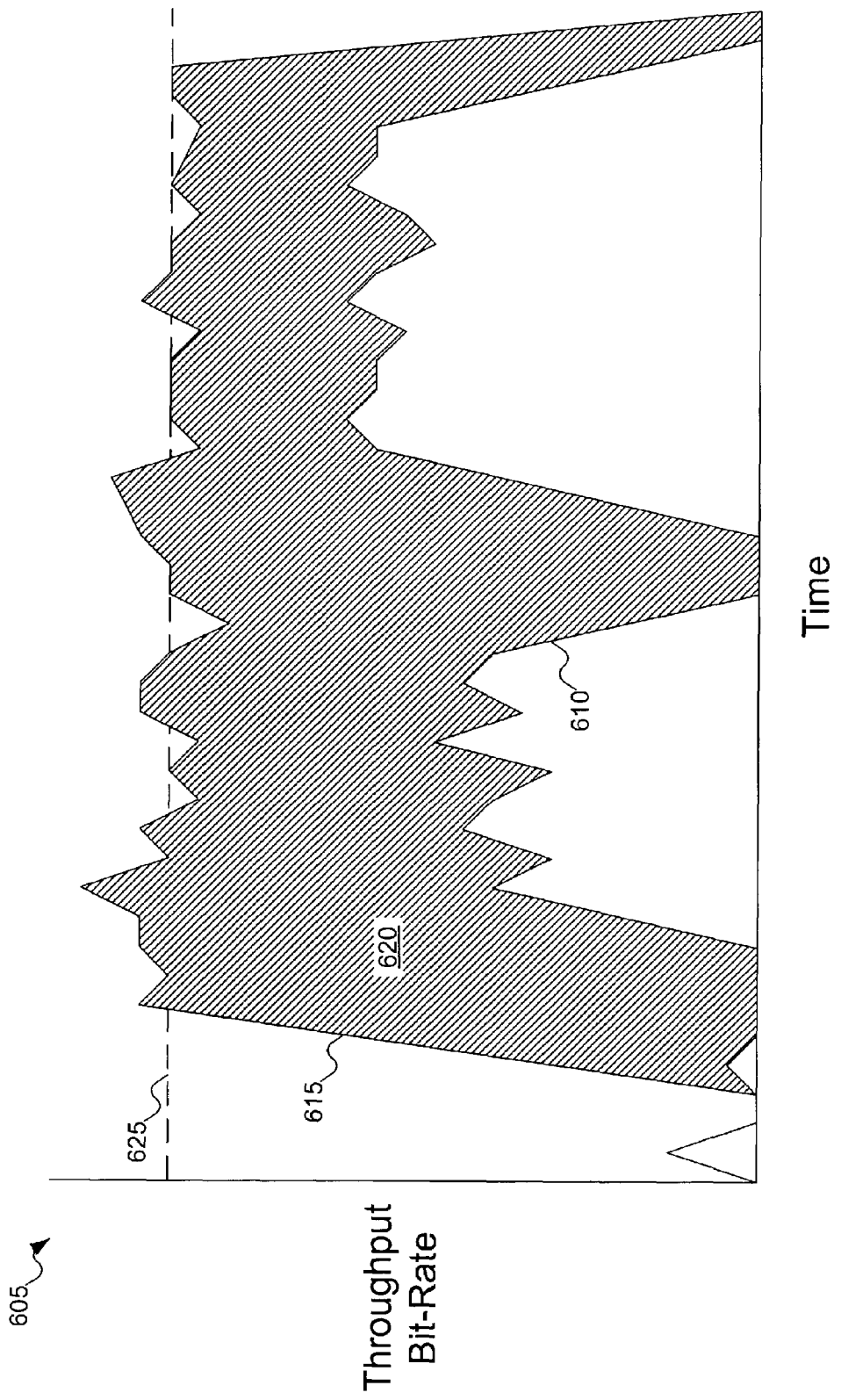
FIG. 6 shows graphs of the traffic on the variable bit-rate network both before and after injection of the data from the constant bit-rate network, according to an embodiment of the invention.

FIG. 6 shows graphs of the traffic on the variable bit-rate network both before and after injection of the data from the constant bit-rate network, according to an embodiment of the invention. In FIG. 6, graph 605 shows two lines. Line 610 represents the traffic on the variable bit-rate network before the injection of data from the constant bit-rate network. Line 615 represents the bit-rate consumed by the combination of the traffic and the constant bit-rate data. Hashed area 620 shows the bit-rate of the variable bit-rate network being consumed by data from the constant bit-rate network. Note that the combination is running at roughly the maximum capacity of the variable bit-rate network (represented by dashed line 625).

Note that line 615 occasionally peaks over 625. Since the constant-to-variable cache router only has an approximation of the available bit-rate, which may change quite often, it is difficult for constant-to-variable cache router to know if it is using too much of the variable bit-rate network bandwidth. There are two approaches that may be taken to address this problem.

The first approach recognizes that the available bit-rate returned from the monitor is an approximation of the available bit-rate over a period of time. Then, rather than utilizing the "entire" available bit-rate, the constant-to-variable cache router uses substantially all of the available bit rate and leaves some percentage (for example, 5%) of the available bit-rate unutilized. Then, if there is a minor fluctuation in traffic on the variable bit-rate network, the constant-to-variable cache router will not have to worry too much about lost data.

The second approach attempts to make the available bit-rate returned from the monitor "more accurate" by having the monitor return available bit-rates more frequently. As discussed above, the monitor repeatedly calculates the available bit-rate over a time interval and returns the result to the constant-to-variable cache router. For example, the monitor might measure the traffic over a 100-microsecond period, report out the available bit rate, and wait another 400 microseconds before measuring the available bit-rate again. The constant-to-variable cache router may send a feedback protocol, requesting that the monitor measure the available more frequently (say, waiting only 100 microseconds between measurements). By sending the feedback protocol and changing the way the monitor measures the available bit-rate, the constant-to-variable cache router may be better able to avoid over-utilizing the available bit-rate. (A person skilled in the art will also recognize that the constant-to-variable cache router may utilize a combination of these approaches.)

Figure 7A:
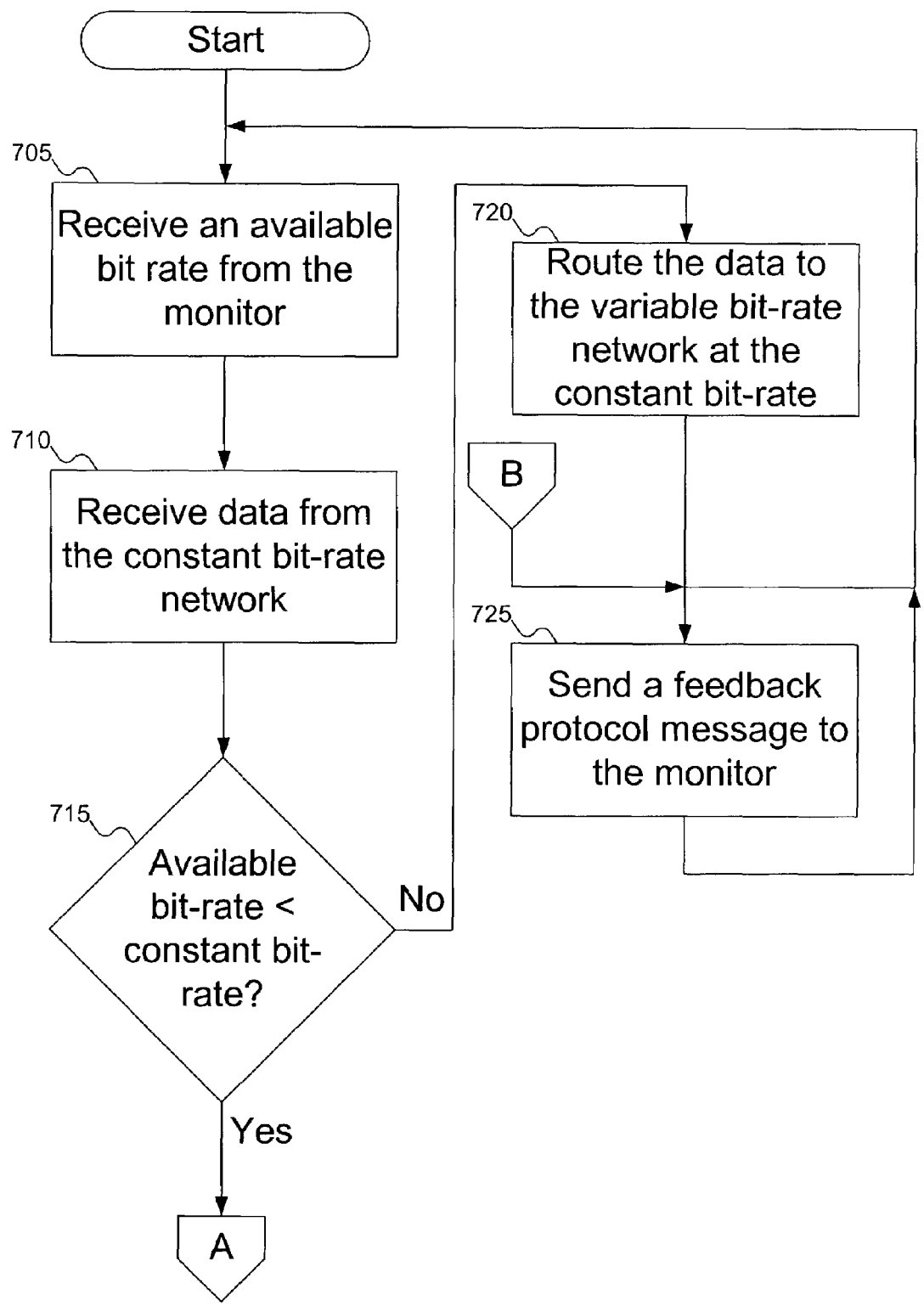
FIGS. 7A-7B show a flowchart of the procedure used by the constant-to-variable cache router to inject data from the constant bit-rate network into the variable bit-rate network, according to an embodiment of the invention.
Figure 7B:
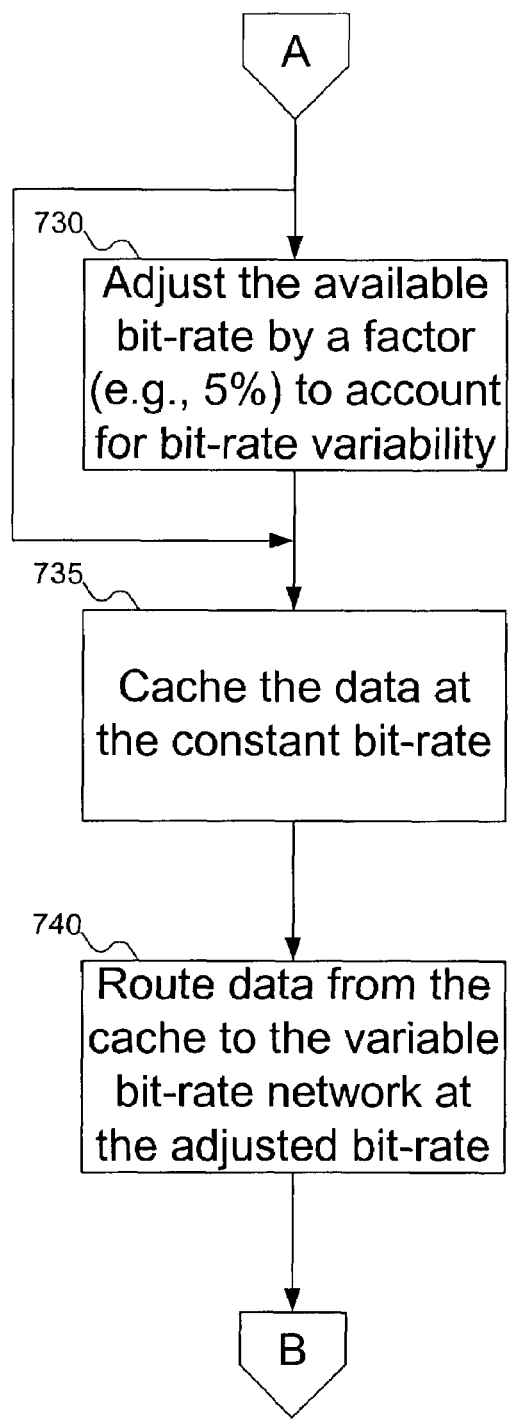

FIGS. 7A-7B show a flowchart of the procedure used by the constant-to-variable cache router to inject data from the constant bit-rate network into the variable bit-rate network, according to an embodiment of the invention. In FIG. 7A, at block 705, the constant-to-variable cache router receives an available bit-rate from the monitor. At block 710, the constant-to-variable cache router receives data from the constant bit-rate network. At block 715, the constant-to-variable cache router compares the available bit-rate to the constant bit-rate. If the available bit-rate is greater than the constant bit-rate, then at block 720, the constant-to-variable cache router routes the data to the variable bit-rate network, and (optionally) at block 725 sends a feedback protocol to the monitor.

If the available bit-rate is less than the constant bit-rate, then at block 730 (FIG. 7B), the constant-to-variable cache adjusts the available bit-rate by a buffer amount, to avoid over-utilizing the available bit-rate and potentially losing data. As discussed above with reference to FIG. 6, this is an optional block, as the constant-to-variable cache router may operate on the assumption that the available bit-rate is just that: available. At block 735, the data is cached by the constant-to-variable cache router, and at block 740 the cached data is routed to the variable bit-rate network at the (potentially adjusted) available bit-rate. Control then returns to FIG. 7A, where (at block 725) the constant-to-variable cache router may send an optional feedback protocol.

Figure 8:
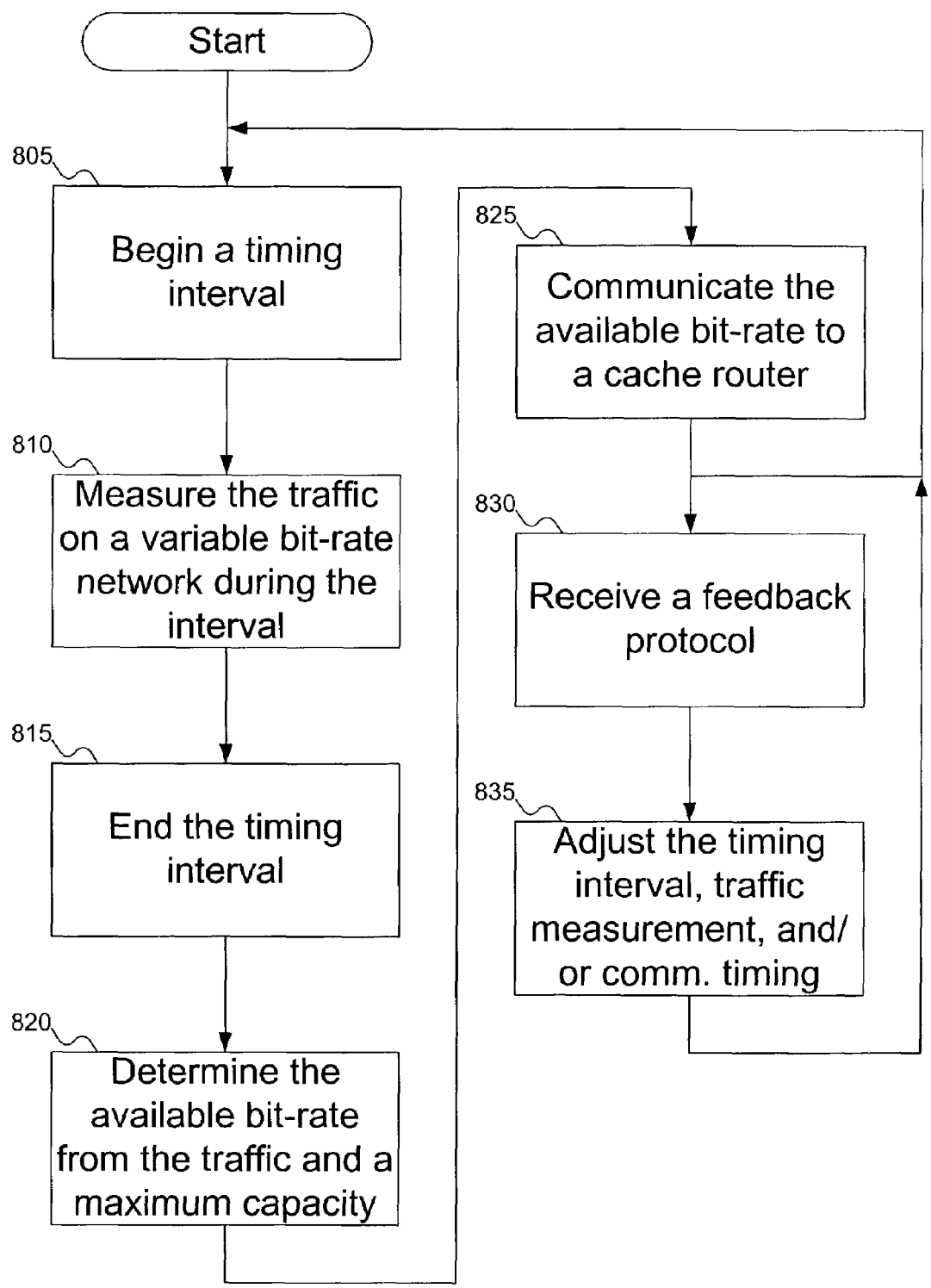
FIG. 8 shows a flowchart of the procedure used by the monitor to determine the available bit-rate of the variable bit-rate network, according to an embodiment of the invention.

FIG. 8 shows a flowchart of the procedure used by the monitor to determine the available bit-rate of the variable bit-rate network, according to an embodiment of the invention. At block 805, the monitor begins a timing interval. At block 810, the monitor measures the traffic on the variable bit-rate network during the interval. At block 815, the monitor ends the timing interval. At block 820, the monitor calculates the available bit-rate based on the maximum capacity of the variable bit-rate network and the traffic on the network. At block 825, the monitor communicates the available bit-rate to the constant-to-variable cache router. Control may then return to block 805 (possibly after some waiting interval), or at block 830 the monitor may receive a feedback protocol from the constant-to-variable cache router. In that case, at block 835, the monitor adjusts the timing interval, traffic measurement, and/or the communications timing interval in accordance with the feedback protocol. Control then returns to block 805.

A person skilled in the art will recognize that an embodiment of the invention described above may be implemented using a computer. In that case, the method is embodied as instructions that comprise a program (in this case, instructing a central processing unit how to execute other programs). The program may be stored on computer-readable media, such as floppy disks, optical disks (such as compact discs), fixed disks (such as hard drives), random access memory (RAM), read-only memory (ROM), or flash memory. The program may then be executed on a computer to implement the method. A person skilled in the art will also recognize that an embodiment of the invention described above may include a computer-readable modulated carrier signal, and that the program, or portions of its execution, may be distributed over multiple computers in a network.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A system for utilizing a constant bit-rate network including a constant bit-rate, and a variable bit-rate network, the system comprising:

a monitor within the variable bit-rate network, operative to determine an available bit-rate of the variable bit-rate network, the monitor including:

an accumulator operative to accumulate a size for a packet as a traffic on the variable bit-rate network if the packet crosses the variable bit-rate network; and a subtractor operative to determine the available bit-rate as a difference between a maximum capacity of the variable bit-rate network and the traffic on the variable bit-rate network; and a constant-to-variable cache router, communicatively coupled to the constant bit-rate network and the variable bit-rate network and operative to deliver content from the constant bit-rate network to the variable bit-rate network, the constant-to-variable cache router including a cache to buffer a first data from the constant bit-rate network when the constant bit-rate of the constant bit-rite network exceeds the available bit-rate of the variable bit-rate network.

2. A system according to claim 1, wherein:

the monitor includes a first communications module; and the constant-to-variable cache router includes a second communications module.

3. A system according to claim 2, wherein:

the first communications module is operative to transmit a message including the available bit-rate to the second communications module; and the second communications module is operative to receive the message from the first communications module.

4. A system according to claim 2, wherein:
the second communications module is operative to send a message including a feedback protocol to the first communications module; and
the first communications module is operative to receive the message from the second communications module.

5. A system according to claim 4, wherein the first communications module is further operative to schedule a message including the available bit-rate to the second communications module according to the feedback protocol.

6. A system according to claim 1, wherein the constant-to-variable router is operative to route the first data from the cache to the variable bit-rate network before routing a second data from the constant bit-rate network.

7. A system according to claim 1, wherein:
the variable bit-rate network includes first and second endpoints;
the constant-to-variable cache router is coupled to the first endpoint of the variable bit-rate network;
at least one computer is coupled to the second endpoint of the variable bit-rate network; and
the monitor is located within the variable bit-rate network so as to measure the available bit-rate at the second endpoint of the variable bit-rate network.

8. A system according to claim 1, wherein the constant-to-variable cache router is operative to route a data from the constant bit-rate network to the variable bit-rate network at a rate no higher than the available bit-rate of the variable bit-rate network.

9. A system according to claim 1, wherein the monitor includes a timer for timing an interval between available bit-rate determinations.

10. A monitor for measuring an available bit-rate of a variable bit-rate network, comprising:
a packet examiner, operative to examine a packet and determine if the packet crosses the variable bit-rate network;
a bit-rate measurer operative to use the packet examiner to measure an available bit-rate of the variable bit-rate network, including:
an accumulator operative to accumulate a size for the packet as a traffic on the variable bit-rate network the packet crosses the variable bit-rate network; and
a subtractor operative to determine the available bit-rate as a difference between a maximum capacity of the variable bit-rate network and the traffic on the variable bit-rite network;
a timer; and
a communications module operative to transmit a message including the available bit-rate when the timer finishes.

11. A monitor according to claim 10, wherein the packet examiner includes a packet duplicator to copy the packet.

12. A monitor according to claim 10, wherein the packet examiner is operative to determine a source and/or destination address for the packet to determine if the packet crosses the variable bit-rate network.

13. A constant-to-variable cache router for utilizing a constant bit-rate network and a variable bit-rate network, comprising:
a communications module operative to receive an available bit-rate of the variable bit-rate network, the available bit-rate of the variable bit-rate network calculates as difference between a maximum capacity of the variable bit-rate network and and accumulate traffic on the variable bit-rate network;
a router operative to route a first data from the constant bit-rate network to the variable bit-rate network; and
a cache operative to cache at least part of the first data from the constant bit-rate network when a constant bit-rate of the constant bit-rate network exceeds the available bit-rate of the variable bit-rate network.

14. A constant-to-variable cache router according to claim 13, wherein the router is operative to route the part of the first data from the cache before routing a second data from the constant bit-rate network to the variable bit-rate network.

15. A constant-to-variable cache router according to claim 13, further comprising:
a first connection to the constant bit-rate network; and
a second connection to the variable bit-rate network.

16. A method for mapping data between a constant bit-rate network and a variable bit-rate network, comprising:
receiving an available bit-rate of the available network, the available bit-rate of the variable bit-rate network calculated as a difference between a maximum capacity of the variable bit-rate network and an accumulated traffic on the variable bit-rate network;
receiving a first data from a constant bit-rate network, the constant bit-rate network having a constant bit-rate higher than an available bit-rate of a variable bit-rate network;
delivering a first portion of the first data to the variable bit-rate network at a rate no higher than the available bit rate; and
buffering a second portion of the first data in a cache.

17. A method according to claim 16, further comprising delivering the second portion of the first data to the variable bit-rate network at the rate no higher than the available rate after the first portion of the first data has been delivered.

18. A method according to claim 16, further comprising:
receiving a second data from the constant bit-rate network; and
buffering a second data in the cache until after the second portion of the first data has been delivered to the variable bit-rate network.

19. A method according to claim 18, further comprising delivering the second data to the variable bit-rate network.

20. A method according to claim 16, wherein delivering a first portion of the first data includes delivering the first portion of the first data to the variable bit-rate network at substantially the available bit-rate.

21. A method according to claim 16, further comprising:
receiving a second available bit-rate of the variable bit-rate network from the monitor within the variable bit-rate network; and
adjusting the delivery of the first portion of the first data to the variable bit-rate network to a second rate no higher than the second available bit rate.

22. A method according to claim 16, further comprising receiving the available bit-rate of the variable bit-rate network from the monitor within the variable bit-rate network.

23. A method according to claim 22, further comprising communicating a feedback protocol to the monitor.

24. A method for using a monitor in a variable bit-rate network, comprising:
beginning a timing interval;
measuring a traffic on the variable bit-rate network during the timing interval using an accumulator operative to accumulate a size for a packet as the traffic on the variable bit-rate network if the packet crosses the variable bit-rate network;

ending the timing interval;

determining an available bit-rate of the variable bit-rate network by subtracting the traffic on the variable bit-rate network from a maximum capacity of the variable bit-rate network; and communicating the available bit-rate to a constant-to-variable cache router.

25. A method according to claim 24, further comprising:

receiving a feedback protocol from the constant-to-variable cache router; and adjusting the timing interval, the procedure for measuring traffic, and/or a timing for communicating the available bit-rate to the constant-to-variable cache router according to the feedback protocol.

26. An article comprising:

computer readable medium, said computer readable medium having stored thereon instructions, that, when executed by a constant-to-variable cache router, result in:

receiving available bit-rate of the variable bit-rate network the available bit-rate of the variable bit-rate network calculated as a difference between a maximum capacity of the variable bit-rate network and an accumulated traffic on the variable bit-rite network;

receiving a first data from a constant bit-rate network, the constant bit-rate network having a constant bit-rate higher than an available bit-rate of a variable bit-rate network;

delivering a first portion of the first data to the variable bit-rate network at a rate no higher than the available bit rate; and buffering a second portion of the first data in a cache.

27. An article according to claim 26, wherein the instructions further include delivering the second portion of the first data to the variable bit-rate network at the rate no higher than the available rate after the first portion of the first data has been delivered.

28. An article according to claim 26, wherein the instructions further include:

receiving a second data from the constant bit-rate network; and buffering a second data in the cache until after the second portion of the first data has been delivered to the variable bit-rate network.

29. An article according to claim 28, wherein the instructions further include delivering the second data to the variable bit-rate network.

30. An article according to claim 26, wherein delivering a first portion of the first data includes delivering the first portion of the first data to the variable bit-rate network at substantially the available bit-rate.

31. An article according to claim 26, wherein the instructions further include:

receiving a second available bit-rate of the variable bit-rate network from the monitor within the variable bit-rate network; and adjusting the delivery of the first portion of the first data to the variable bit-rate network to a second rate no higher than the second available bit rate.

32. An article according to claim 26, wherein the instructions further include receiving the available bit-rate of the variable bit-rate network from the monitor within the variable bit-rate network.

33. An article according to claim 32, further comprising communicating a feedback protocol to the monitor.

34. An article comprising:

a computer readable medium, said computer readable medium having stored thereon instructions, that, when executed by a monitor in a variable bit-rate network, result in:

beginning a timing interval;

measuring a traffic on a variable bit-rate network during the timing interval using an accumulator operative to accumulate a size for a packet as the traffic on the variable bit-rate network if the crosses the bit-rate network;

ending the timing interval;

determining an available bit-rate of the variable bit-rate network by subtracting the traffic on the variable bit-rate network from a maximum capacity of the variable bit-rate network; and communicating the available bit-rate to a constant-to-variable cache router.

35. An article according to claim 34, wherein the instructions further include:

receiving a feedback protocol from the constant-to-variable cache router; and adjusting the timing interval, the procedure for measuring traffic, and/or a timing for communicating the available bit-rate to the constant-to-variable cache router according to the feedback protocol.

* * * * *

UNITED STATES PATENT AND TRADEMARK OFFICE
CERTIFICATE OF CORRECTION

PATENT NO. : 7,292,574 B2  Page 1 of 1
APPLICATION NO. : 10/261827
DATED : November 6, 2007
INVENTOR(S) : Ramesh Pendakur et al.

It is certified that error appears in the above-identified patent and that said Letters Patent is hereby corrected as shown below:

Column 2, line 46, the word "interface" should read -- Interface --;
Column 5, line 46, the word "action)" should read -- action. --;
Column 8, line 55, the word "bit-rite" should read -- bit-rate --;
Column 9, line 43, the word "network" should read -- network if --;
Column 9, line 48, the word "bit-rite" should read -- bit-rate --;
Column 9, line 64, the word "calculates" should read -- calculated --;
Column 9, line 65, the word "as" should read -- as a --;
Column 9, line 66, the word "and accumulate" should read -- as accumulated --;
Column 10, line 17, the word "available" should read -- variable bit-rate --;
Column 11, line 16, the word "computer" should read -- a computer --;
Column 11, line 20, the word "receiving" should read -- receiving an --;
Column 11, line 24, the word "bit-rite" should read -- bit-rate --;
Column 12, line 28, the word "the crosses" should read -- the packet crosses --;
Column 12, line 28, the word "the bit-rate" should read -- the variable bit-rate --.

Signed and Sealed this

Twenty-sixth Day of May, 2009

JOHN DOLL
*Acting Director of the United States Patent and Trademark Office*